US011271917B2

(12) United States Patent
McGee et al.

(10) Patent No.: US 11,271,917 B2
(45) Date of Patent: Mar. 8, 2022

(54) SYSTEM SECURITY INFRASTRUCTURE FACILITATING PROTECTING AGAINST FRAUDULENT USE OF INDIVIDUAL IDENTITY CREDENTIALS

(71) Applicant: Tactical Lighting Systems, Addison, IL (US)

(72) Inventors: James P. McGee, Chicago, IL (US); Kevin M. Cutts, Lake Zurich, IL (US)

(73) Assignee: Tactical Lighting Systems, Addison, IL (US)

( * ) Notice: Subject to any disclaimer, the term of this patent is extended or adjusted under 35 U.S.C. 154(b) by 330 days.

(21) Appl. No.: 16/591,280

(22) Filed: Oct. 2, 2019

(65) Prior Publication Data
US 2020/0112552 A1 Apr. 9, 2020

Related U.S. Application Data (60) Provisional application No. 62/740,570, filed on Oct. 3, 2018.

(51) Int. Cl.
*H04L 29/06* (2006.01)
*H04L 51/046* (2022.01)

(52) U.S. Cl.
CPC ............ *H04L 63/08* (2013.01); *H04L 51/046* (2013.01); *H04L 63/0823* (2013.01)

(58) Field of Classification Search
CPC .... H04L 63/08; H04L 63/0823; H04L 51/046
See application file for complete search history.

(56) References Cited

U.S. PATENT DOCUMENTS

| | | | | |
|---|---|---|---|---|
| 9,391,838 | B2 * | 7/2016 | Jiang | H04W 24/02 |
| 2002/0083008 | A1 * | 6/2002 | Smith | G06Q 20/4014 |
| | | | | 705/64 |
| 2002/0157029 | A1 * | 10/2002 | French | H04L 63/0823 |
| | | | | 726/21 |
| 2006/0101508 | A1 * | 5/2006 | Taylor | G06F 21/32 |
| | | | | 726/7 |
| 2007/0271221 | A1 * | 11/2007 | Gephart | G06F 21/6245 |
| 2008/0027857 | A1 * | 1/2008 | Benson | G06Q 40/025 |
| | | | | 705/38 |
| 2008/0184351 | A1 * | 7/2008 | Gephart | H04L 63/1416 |
| | | | | 726/7 |

(Continued)

OTHER PUBLICATIONS

David Bauer et al., Minimal Information Disclosure with Efficiently Verifiable Credentials, Oct. 31, 2008, ACM, pp. 15-24. (Year: 2008).*

(Continued)

*Primary Examiner* — Kari L Schmidt
*Assistant Examiner* — Fahimeh Mohammadi
(74) *Attorney, Agent, or Firm* — Leydig, Voit & Mayer, Ltd.

(57) ABSTRACT

A networked infrastructure is described that includes a set of programmed computing nodes, each node being configured with a processor and non-transitory computer readable media including computer-executable instructions that, when executed by the processor, facilitate a social security number registry server carrying out a method that provides an individual with the ability to remotely approve or disapprove, in real-time, the use of his/her social security number (SSN) by a relying party server.

12 Claims, 5 Drawing Sheets

(56) References Cited

U.S. PATENT DOCUMENTS

| | | | |
|---|---|---|---|
| 2009/0259588 A1* | 10/2009 | Lindsay | G06Q 20/102 705/40 |
| 2013/0073859 A1* | 3/2013 | Carlson | G06Q 20/325 713/176 |
| 2013/0191889 A1* | 7/2013 | Asghari-Kamrani | G06Q 20/3823 726/5 |
| 2018/0219846 A1* | 8/2018 | Poschel | H04L 63/0807 |
| 2018/0337778 A1* | 11/2018 | Scheiblauer | H04L 9/3239 |
| 2020/0403992 A1* | 12/2020 | Huffman | H04L 63/102 |

OTHER PUBLICATIONS

John Gerdes, Jr., The Viability of Supporting Anonymous Employees, Apr. 2004, ACM, vol. 47, No. 4, pp. 98-100. (Year: 2004).*

Simson L. Garfinkel, Email-Based Identification and Authentication: An Alternative to PKI?, Nov.-Dec. 2003, IEEE, vol. 1, Issue: 6, pp. 20-26. (Year: 2003).*

Pelin Angin et al., An Entity-centric Approach for Privacy and Identity Management in Cloud Computing, Oct. 31-Nov. 3, 2010, IEEE, pp. 177-183. (Year: 2010).*

* cited by examiner

SYSTEM SECURITY INFRASTRUCTURE FACILITATING PROTECTING AGAINST FRAUDULENT USE OF INDIVIDUAL IDENTITY CREDENTIALS

CROSS-REFERENCE TO RELATED APPLICATIONS

This patent application claims the benefit of U.S. Provisional Patent Application No. 62/740,570, filed Oct. 3, 2018 which is incorporated herein by reference.

TECHNOLOGICAL AREA

The present disclosure relates generally to secure authentication infrastructures for server computing systems, and more particularly to secure authentication infrastructures implemented in a networked server computer system environment.

BACKGROUND

A variety of security measures are currently implemented to ensure that access to server resources is limited solely to authorized users. Such security measures are based upon a variety of private information and processes that use such information to authenticate authorized users prior to accessing/using server resources. Social Security numbers (SSNs) enable the Social Security Administration to track citizens and permanent residents for Social Security purposes. Usage of SSNs evolved over time with SSNs now used by the government as a de facto national identification number and by private organizations as a unique individual identifier. Customer, employee, patient, student and credit records are often tied to an SSN.

The SSN may be used to authenticate an individual's identity based on the assumption that no one knows it except for the person to whom it was issued. Since such knowledge of an SSN and other personally identifiable information (PII) has often been sufficient to authenticate an individual's identity, criminals have developed many ways to profit from fraudulently using SSNs.

According to the FTC, identity thieves use SSNs to apply for government benefits, open bank and credit card accounts, apply for a loan or utility service, or rent a place to live (i.e., identity theft). They may use an SSN to get the victim's tax refund or a job in the victim's name (i.e., tax identity theft). They may use identity information to see a doctor, get prescription drugs, file claims with the victim's insurance provider, and/or get other care in the victim's name (i.e., medical identity theft). They may also fraudulently use children's Social Security numbers (child identity theft).

Summarized below are security measures proposed/espoused by the FTC and used by consumers to protect against identity theft. However, despite the availability and usage of such measures, the incidence of identity theft has continued to rise according to FTC statistics.

Secure Personal Information:

Individuals protect their SSNs and other personal information by minimizing to whom it is disclosed; securely storing and disposing of it; and maintaining appropriate security on computers and other electronic devices. However, even excellent personal security measures cannot prevent identity theft from occurring if an individual's SSN and/or personal identity information (PII) are exposed in a data breach. For example, the Equifax data breach exposed over 143 million SSNs despite efforts employed by Equifax to protect the personal information.

Credit and Identity Monitoring:

Credit monitoring involves tracking, on an individual basis, the activity on the individual's credit reports. If an individual spots activity that may have resulted from identity theft, steps can be taken to resolve the credit security breach before it leads to a loss by either the credit provider or user. Identity monitoring services track other data sources to alert an individual if personal information is being used in ways that generally do not show up on a credit report (e.g. change of address requests, court records, orders for new utility services, social media, websites that identity thieves use to trade stolen information, etc.). However, neither credit monitoring nor identity monitoring stop identity theft, but rather provide notification after such theft occurs. Additionally, credit monitoring only warns about activity that shows up on an individual's credit report, and identity monitoring only warns of activity that shows up in the databases being monitored. While these services capture many types of identity theft, they do not cover all types. For example, these services will not detect an identity thief: withdrawing money from a victim's bank account, using a victim's SSN to file a tax return and collect the refund, and/or using a victim's SSN to receive government benefits.

Credit Freeze:

A credit freeze lets an individual restrict access to his credit report, which in turn makes it more difficult for an identity thief to open new accounts in his name. However, credit freezes require substantial effort in creating the freeze with the three reporting agencies and lifting them when credit is desired. Additionally, credit freezes do not protect against identity thieves responding to a victim's pre-solicited credit offers, withdrawing money from a victim's bank account, using a victim's SSN to file a tax return and collect the refund, and/or using a victim's SSN to receive Government benefits.

Given the Equifax data breach and the many other large-scale data breaches, the assumption that an individual's knowledge of the SSN can be used to reliably authenticate an individual's identity is a faulty one. Businesses, governments, educational institutions, and others seeking to reliably authenticate an individual's identity require authentication methods that have not been compromised. While replacement of the SSN with a PKI public/private key pair solves many of the problems associated with knowledge-based authentication, a massive investment would be needed to update systems that currently rely on the SSN, and individuals and organizations would experience significant disruption. Additionally, loss or compromise of a private key in such a scenario would create a burden associated with its replacement for the Government, the individual, and organizations that rely on the SSN.

SUMMARY OF THE DISCLOSURE

An infrastructure and method of operation of the infrastructure are described that enhance operation of network server authentication facilities to ensure authorized access to secure server resources is limited only to authorized users and thereby protect against fraudulent use of an individual's SSN, and do not require massive investment and disruption that may result from replacement of the SSN.

The disclosed infrastructure and method enhance operation of network server authentication facilities by requiring registered end users to remotely approve or disapprove the use of their SSNs (presented to relying party servers) in real time and through use of cryptographic methods to authenticate their identity. Unlike the knowledge-based authentication widely in use, the embodied cryptographic authentication methods provide strong security even if knowledge of an SSN has been breached.

Additionally, the described infrastructure and method of operation provides for continued use of knowledge-based authentication by networked server systems of individuals and organizations that have chosen not to use cryptographic authentication methods, thereby providing a transitioning mechanism for migrating from current systems to the authenticating method described herein with minimal disruption.

The infrastructure and method described herein enable server systems to provide enhanced authentication measures that, in turn, provide protection against fraudulent use of an individual's Social Security Number (SSN). Such enhancements to authentication measures of networked servers can be implemented without massive investment and disruption associated with wholesale replacement of the SSN by alternative unique identification mechanisms.

The infrastructure and method described herein also allow for individuals to secure their identities, in the context of accessing restricted server resources, by providing them with the ability to remotely approve or disapprove the use of their SSNs in real time and by using cryptographic methods of authenticating identity by networked servers. Since the described authentication is not knowledge-based, the cryptographic methods provide strong security even if the SSN has been breached. At the same time, the provided described particular examples of the present invention allow for continued use of knowledge-based authentication for individuals and/or organizations that have chosen not to use the cryptographic methods, minimizing disruption and allowing for a smooth transition.

The networked server user authentication is accomplished through the use of a special digital certificate containing the SSN (or hashed version of it) and an associated private key. The digital certificate does not replace an individual's SSN, but rather binds the SSN to possession and use of the private key. The networked server, upon receipt of an access request, forwards a real-time SSN authentication request from a relying party to the SSN owner if the owner's SSN is stored on the server. The real-time SSN authentication request provides the SSN owner an opportunity to provide a response that either approves or disapproves of the use of SSN and if approval is given, SSN ownership is authenticated through standard cryptographic algorithms.

The infrastructure and method of operation may be applied to any of multiple forms of identification.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

Figure 1:
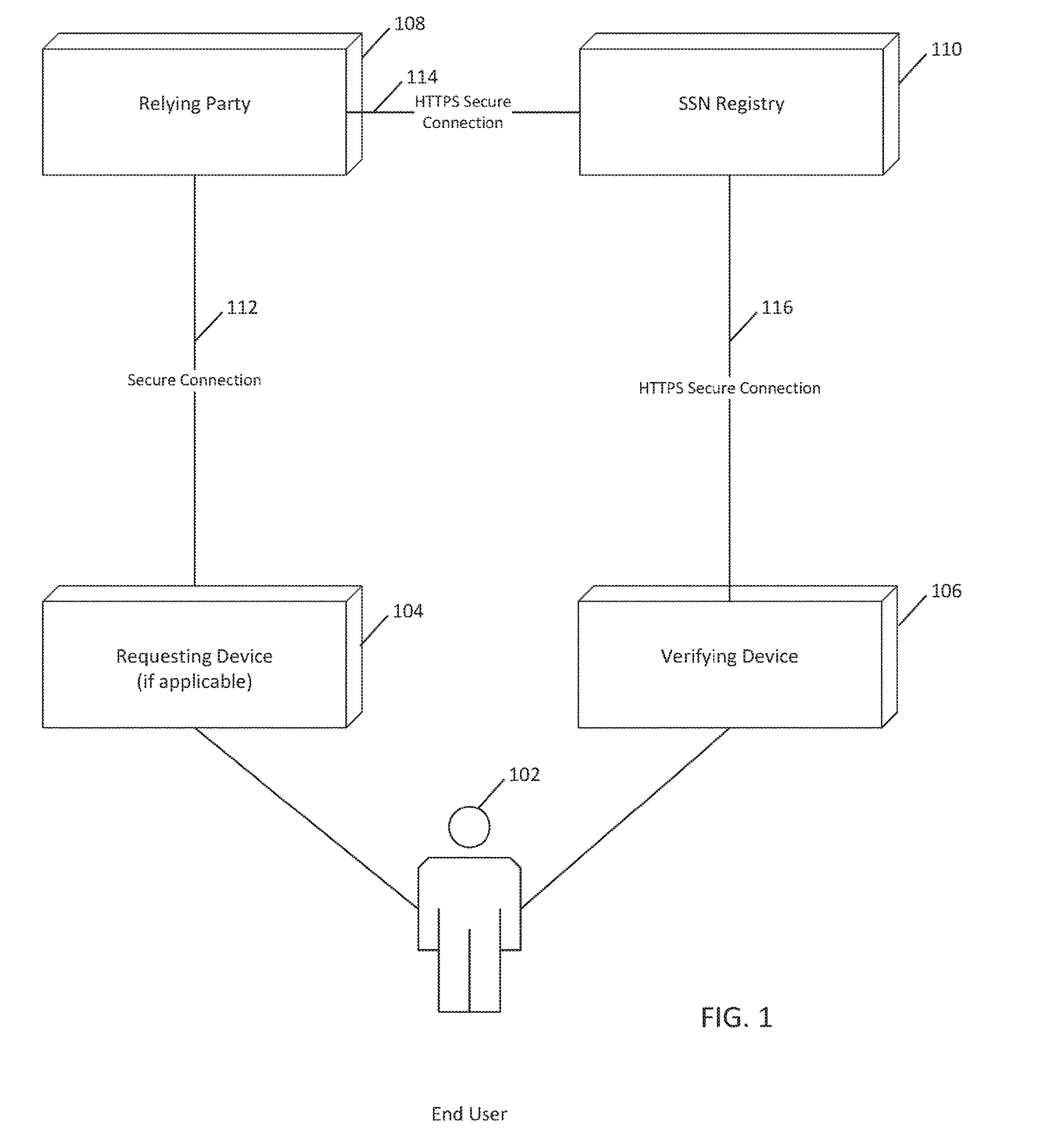
FIG. 1 is a schematic drawing of an exemplary networked infrastructure incorporating data elements and executable instructions performed by computer systems for providing protection against fraudulent use of an individual's identification information (e.g. SSN)

A networked server-based system infrastructure (see FIG. 1) and method (see FIGS. 2, 3A, 3B and 3C) described herein provide a networked server system with an enhanced level of security by enabling contacting an individual during an authentication procedure on the networked server, and thereby providing the individual with an ability to remotely approve or disapprove in real-time the use of his/her social security number (SSN) by the server. If use is approved, the infrastructure and method allow the server to remotely authenticate the individual's identity. Additionally, the networked server logs the activity associated with the SSN and allows the SSN owner the ability to view the log. It involves the following elements:

Turning to FIG. 1, an end user 102 is associated with an "SSN digital certificate" and a "private key" associated with it. The SSN digital certificate contains, in the illustrative example, at a minimum: a public key; a name of the owner, a SSN of the owner; and a digital signature of a trusted entity that has verified the SSN digital certificate's contents (including the owner's identity). The public key/private key pair may be generated through a standard algorithm such as RSA, DSA, or ECC or may be generated through any other algorithm that generates a key pair that can be used for asymmetric encryption and digital signing. The SSN may be stored on the certificate as plain text; hashed; salted and hashed; or concatenated with a password, salted and hashed.

A requesting device 104 of the end user 102 may be a computing device containing a CPU, memory, display and input that an individual can use to access, via a public network such as the internet, a relying party 108. The requesting device 104 may also be a phone, mail, in-person, or other electronic and/or physical delivery channels.

A verifying device 106 may be a computing device that an individual uses to approve or disapprove of the use of his or her SSN by the relying party 108. The verifying device 106 may or may not be the same device as the requesting device 104 and contains a CPU, memory, display and input. It has the SSN digital certificate and associated private key stored on its memory. It may or may not contain a wireless transceiver. The verifying device 106 is personal to the user (e.g. a smart phone, a tablet/notebook computer, etc.). The verifying device 106 may be one of many devices associated with the user and capable of receiving messages (e.g. email, text, etc.) from the SSN registry 110 to carry out the functionality described herein.

The relying party 108 may be a web server that collects an individual's SSN and needs, in accordance with illustrative examples, to confirm that a requesting individual is the true owner of the SSN and not an imposter. A relying party 108 server may be associated, but is not be limited to a server providing resources associated with a bank, other financial institution, a government agency (e.g. SSA, IRS, CMS), an educational institution, a health care organization, a business (e.g., online shopping server), or other organization.

A SSN registry 110 may be a server containing a CPU and memory and that has a list of registered SSNs along with associated SSN digital certificates and ancillary information stored in its memory.

A network connection 112 between the requesting device 104 and the relying party 108.

A network connection 114 between the relying party 108 and the SSN registry 110.

A network connection 116 between the SSN registry 110 and the verifying device 106.

Operation of the Security Infrastructure

Figure 2:
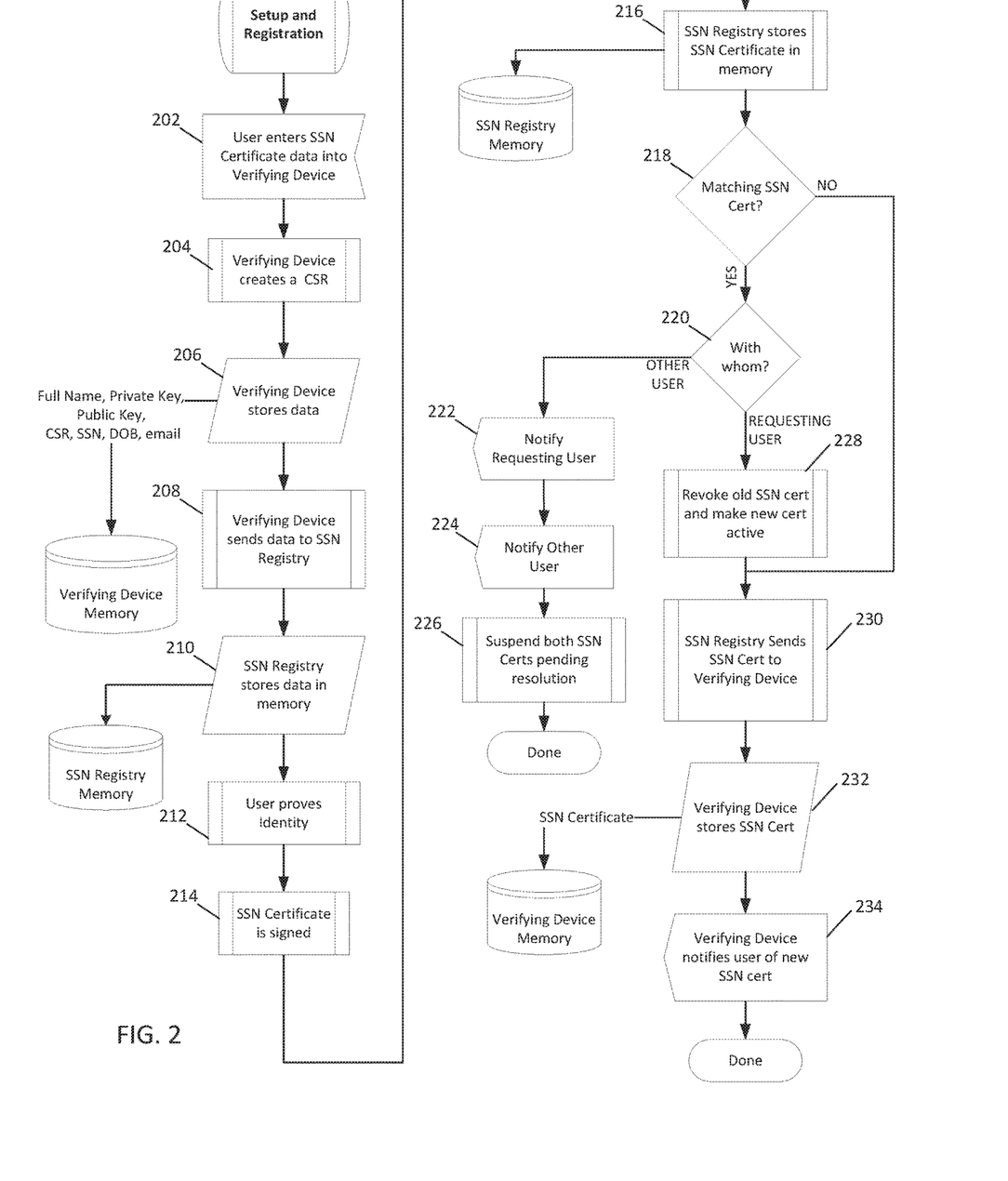
FIG. 2 is a flowchart summarizing setup and registration (i.e. configuration) of user elements of the networked infrastructure in accordance with an exemplary embodiment.
Figure 3A:
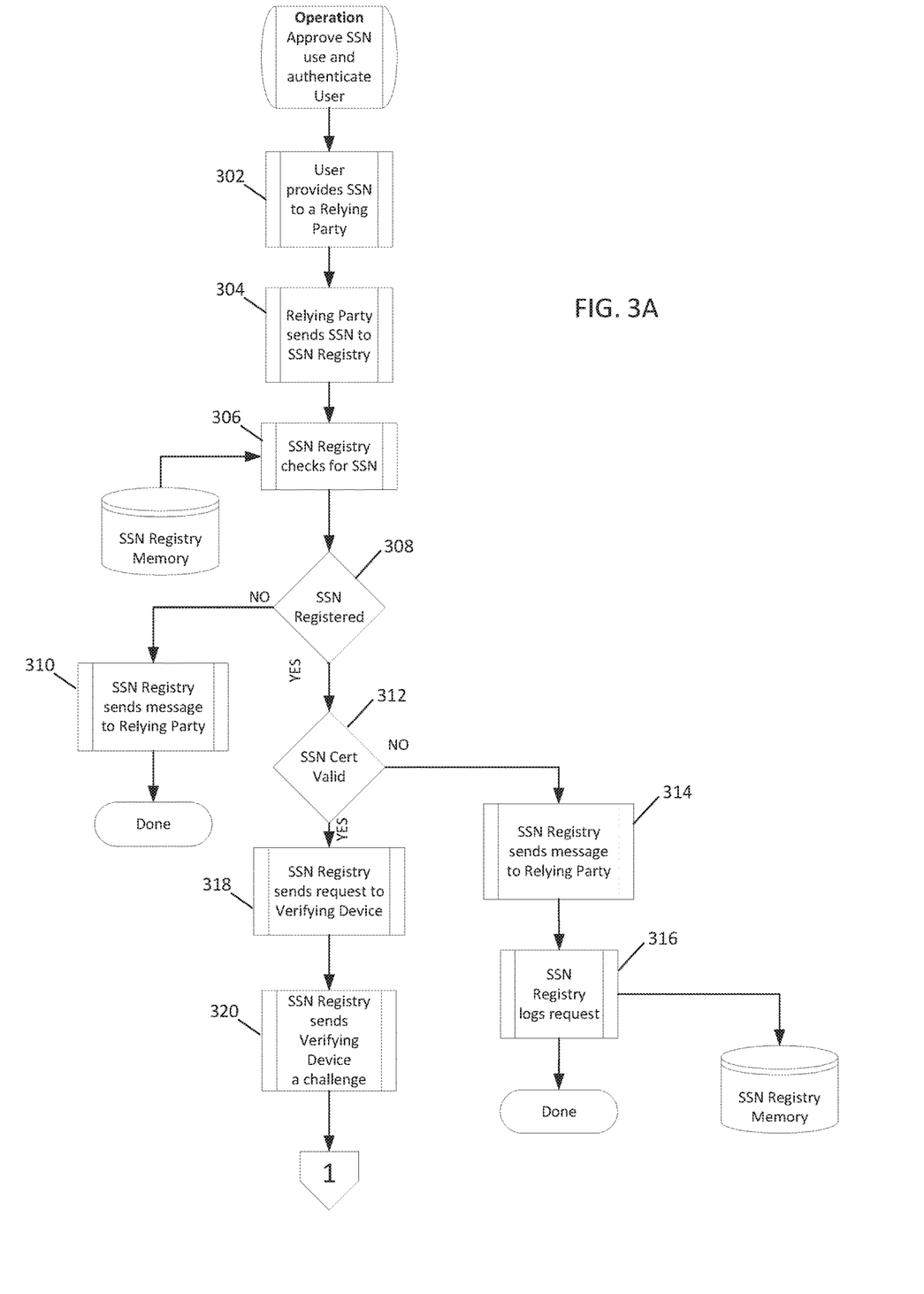
FIGS. 3A, 3B and 3C are a flowchart summarizing operation of the configured infrastructure.
Figure 3B:
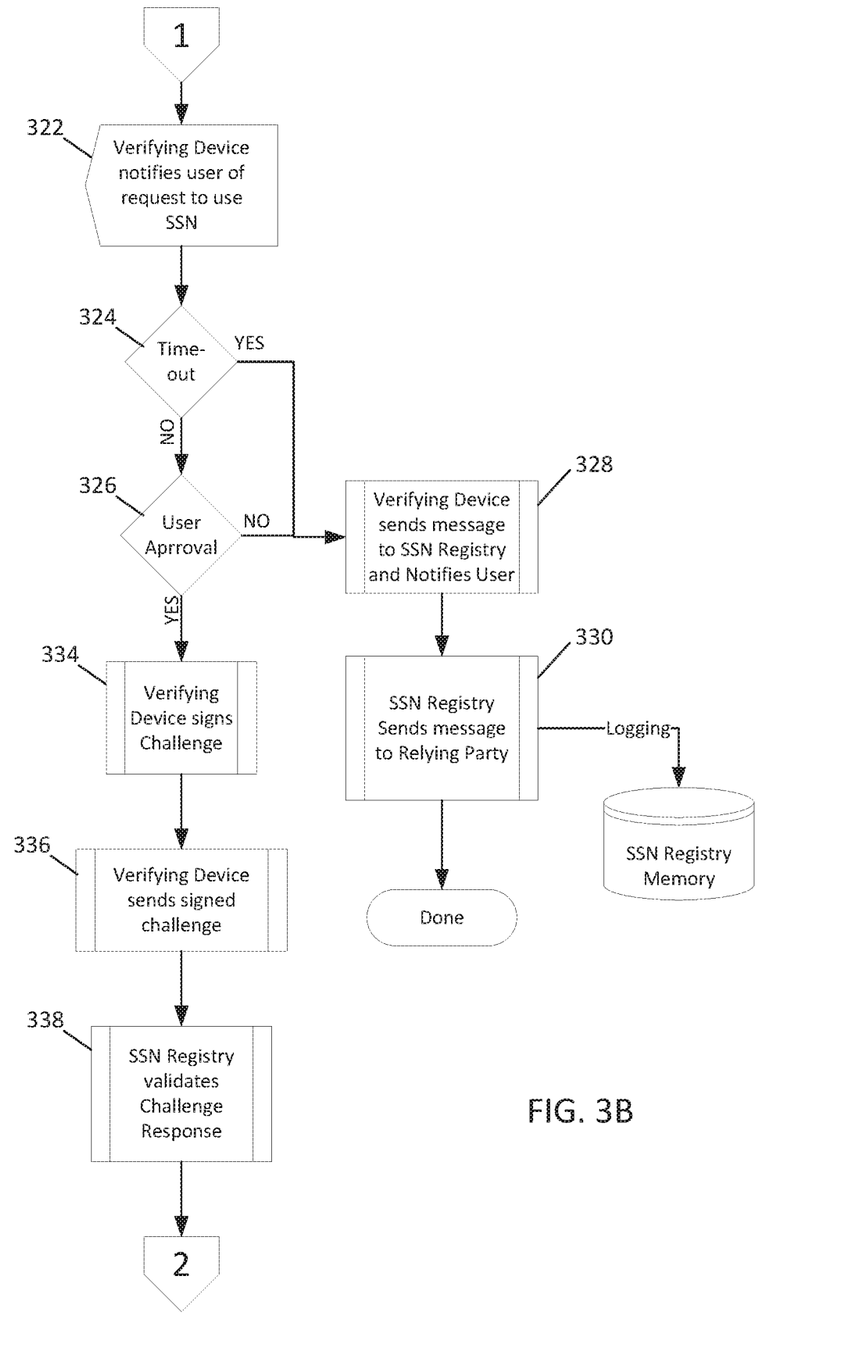
Figure 3C:
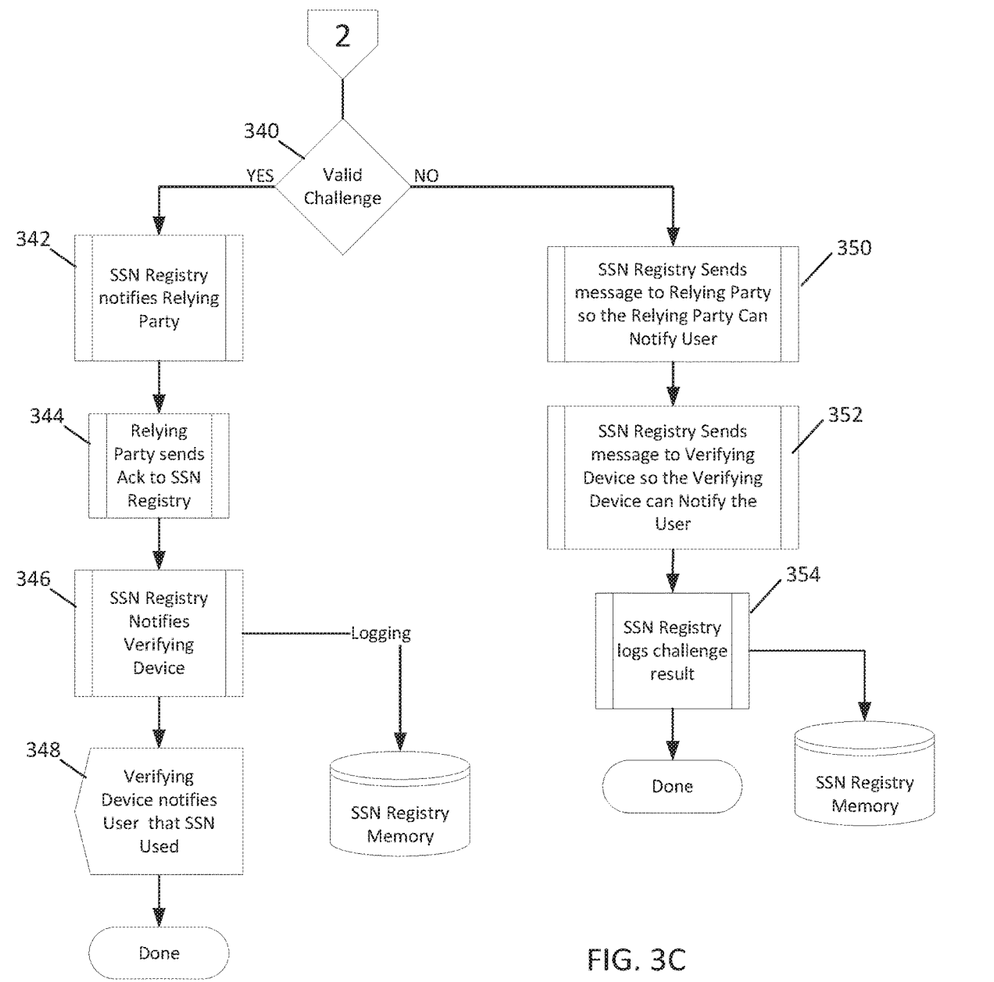

The described infrastructure and method of operation provides the relying party 108 server with the capability of withholding access to protected server resources until a request received from the requesting device 104 has been verified by an individual having the ability to remotely approve or disapprove in real-time the use of his/her social security number (SSN) by the relying party 108 server and until such individual's identity has been authenticated through cryptographic means. The described embodiments of the invention furthermore facilitate creating a log of the activity associated with the SSN and allow the SSN owner the ability to view the log. Setup (configuration) of the elements in FIG. 1 described herein above occurs prior to ongoing operation. In that regard, FIG. 2 provides a flowchart associated with the initial setup. Thereafter, FIGS. 3*a*, 3*b* and 3*c* provide a flowchart associated with ongoing operations. A detailed description of these flowcharts is provided below.

Setup and Registration

The SSN digital certificate, the private key, and associated user data are used for ongoing operations. The SSN digital certificate, the private key, and the associated user data are stored in memory of the verifying device 106. The SSN digital certificate and the associated user data are stored in memory of the SSN registry 110. The initial setup and registration to accomplish this can occur through the steps below or through some other means.

During 202, the user 102 enters a SSN certificate data into the verifying device 106. The user 102 inputs first name, middle name, last name, social security number, date of birth, and email address information into the verifying device 106 via a user interface provided by the verifying device 106.

During 204 the verifying device 106 creates, by way of example, a certificate signing request (CSR) corresponding to the user data entered by the user 102 during 202. The verifying device 106 creates an RSA public/private key pair by running a standard cryptographic algorithm and then stores the keys into memory. DSA, ECC, or any other key pairs allowing for asymmetric encryption and digital signing could be used in place of the RSA key pairs.

During 206 the verifying device 106 creates a file containing the user 102's first name, middle name, last name, SSN, and RSA public key formatted as an X.509 certificate signing request (CSR) or equivalent format. The SSN may be included on the certificate as plain text; hashed; salted and hashed; or concatenated with a password, salted and hashed. The file may include the user's email address as well as other user attributes.

The verifying device 106 stores the above-described CSR and related registered user data. The verifying device 106 writes the CSR, the full name, SSN, DOB, email address, public key, and private key to memory associated with the verifying device 106.

During 208 the verifying device 106 sends data associated with the verified user to the SSN registry 110. In that regard, the verifying device 106 establishes a secure internet connection to the SSN registry 110 and sends the CSR, SSN, DOB, and email address of the verified user (e.g. user 102).

During 210, the SSN registry 110 stores data in memory. The SSN registry writes the SSN, CSR, DOB, and email (or other suitable real-time user notification mechanism) to memory.

During 212, the user 102 proves the user's identity. By way of example, the user's identity is verified by a trusted party.

During 214, upon successful proof of the user's identify during 212, the SSN certificate is signed. For example, once user's identity has been verified during 212, the CSR is digitally signed using a standard cryptographic algorithm with a private key associated with the trusted party that performed the verification. The signed SSN CSR becomes an SSN digital certificate.

During 216, the SSN registry 110 stores the SSN certificate in a memory associated with the SSN registry 110. The SSN registry 110 writes the signed SSN certificate (the SSN digital certificate for the verified user 102) to the memory and associates the stored signed SSN certificate with the SSN of the user 102.

During 218, the SSN registry 110 searches the SSN registry 110 memory to see if there is another SSN certificate associated with the SSN. If there is already an SSN certificate associated with SSN of the user 102, then during 220, SSN registry 110 will determine if the new SSN certificate is valid. By way of example, the SSN registry 110 (compares email addresses of the existing and new SSN certificates) to determine whether the email address associated with the pre-existing SSN certificate matches the email address associated with the new SSN certificate. If the email addresses do not match, then SSN registry 110 will: notify the requesting user during 222; notify the user associated with the existing SSN certificate during 224; and suspend both SSN certificates, pending resolution during 226. If the email addresses of the existing and new SSN certificates match, then control passes to 228. During 228 the SSN registry 110 revokes the old SSN certificate and makes the new SSN certificate active.

During 230, the SSN registry 110 sends the SSN certificate to the verifying device 106. The SSN registry 110 sends the signed SSN certificate to the verifying device 106 through a secure internet connection.

During 232, the verifying device 106 stores the SSN certificate. In particular, the verifying device 106 writes the verified signed SSN certificate to a memory associated with the verifying device 106.

During 234, the verifying device 106 notifies the user 102 of the newly stored verified SSN certificate. By way of example, the verifying device 106 sends a message to an associated display indicating that a verified SSN certificate has been newly stored in the verifying device 106's memory.

Operation of the Configured System

Turning to FIGS. 3*a*, 3*b* and 3*c* that describe subsequent operation of the configured system (including at least the verified SSN certificate of the user 102), during 302, the user 102 provides the user's SSN to, for example, the relying party 108 server. The relying party 108 server is just one of potentially many relying party servers that use the authentication (SSN use) mechanism described herein. The user 102 may communicate the SSN to the relying party 108 server through a web browser. However, the SSN may also be provided by alternative input means such as by phone, in person, mail, or through other means.

During 304, the relying party 108 sends the SSN, received from the user 102 during 102, to the SSN registry 110. By way of a particular example, the relying party 108 sends an SSN authentication request to the SSN registry 110 over a secure network connection. The SSN authentication request contains, for example, at a minimum: the SSN and identifying details of the relying party 108. The SSN authentication request could be sent directly from the relying party 108 to the SSN registry 110 or could be forwarded through one or more intermediaries.

During 306, the SSN registry 110 checks for the SSN within its stored verified user SSN certificate records. By way of a particular example, the SSN registry 110 searches the memory containing the SSN certificate records for a stored SSN that matches the SSN included in the SSN authentication request from the relying party 108.

During 308, if the SSN registry did not find a matching SSN in memory during 306, then during 310 the SSN registry 110 sends an "SSN not found" message to the relying party 108.

During 308, if the SSN registry 110 did find the SSN in memory during 306, then control passes to 312. A certificate validity check is performed during 312, wherein if the certificate is expired or revoked (or otherwise not valid), then control passes to 314 wherein the SSN registry 110 sends an "SSN certificate expired" or "SSN certificate revoked" message to relying party 108. Thereafter control passes to 316 wherein the SSN registry 110 logs the SSN authorization request to an associated memory.

If during 312, the SSN registry 110 contains a valid SSN digital certificate corresponding to the provided SSN in its memory, then control proceeds to 318.

During 318, the SSN registry 110 sends an SSN authorization request to the verifying device 106. By way of a particular example, during 318 the SSN registry 110 sends an SSN authorization request to the verifying device 106 that includes at a minimum: the SSN and identifying details of the relying party 108.

During 320, the SSN registry 110 sends the verifying device 106 a challenge. The SSN registry 110, by way of a particular example, generates and sends a cryptographic challenge to the verifying device 106 to verify that the user 102 is the owner of the SSN previously submitted to the relying device 108 (causing the invoking of the verifying process described herein). The challenge is a pseudo randomly generated sequence of bits designed to be unique (a nonce). The SSN registry 110 stores the challenge in temporary memory. The cryptographic challenge can be included in the same message as the SSN authorization request.

During 322, the verifying device 106 (that may be the same physical device as the requesting device 104) notifies user 102 of the request to use the SSN at the relying party 108 server. The verifying device 106 receives the SSN authorization request and the cryptographic challenge, and then displays details of the SSN authorization request to the user 102 including identifying information of the relying party 108. As summarized in the subsequent conditional blocks, possible user responses to the notification issued by the verifying device 106 are: approval, disapproval, or no response (i.e. message times out).

If the user 102 does not approve the request (see block 326) or if the user 102 does not respond within a predetermined time limit (see block 324), then: (1) during 328 the verifying device 106 sends message to SSN registry 110 (either "SSN use is disapproved" or "SSN authorization request has timed out") and sends an acknowledgement message to the verifying device 106 display, and (2) during 330 the SSN registry 110 receives the message, logs it to associated memory and sends the message to the relying party 108 for the relying party 108 to act on it.

On the other hand, if the user 102 approves the request (block 326), then the user enters a pin or a gesture for biometric authentication if required, and the process proceeds to 334.

During 334, the verifying device 106 signs challenge. The verifying device 106 digitally signs the cryptographic challenge. The verifying device 106 generates a hash of the challenge and then encrypts the hash with the private key stored in memory. Alternatively, the verifying device 106 could simply encrypt the challenge with the private key provided the length of the challenge is suitable for the public key encryption process.

During 336, the verifying device 106 sends the signed challenge. By way of a particular example, the verifying device 106 sends the signed challenge response and a message indicating user approval of the SSN authorization request to SSN registry 110.

During 338 and 340, the SSN registry 110 attempts to validate the challenge response and takes an appropriate responsive action based upon the challenge response validity. The SSN registry 110 verifies the signature on the challenge returned from the verifying device 106 using the SSN Certificate previously stored in memory. The SSN registry 110 reads the SSN Certificate from memory, and then decrypts the response with the public key of the SSN Certificate. The SSN registry 110 compares the decrypted response with the challenge stored in temporary memory. If the stored version of the challenge matches the decrypted version, the signature is determined to be valid.

If the Challenge Response is not valid, then (in no particular order) during 354 the SSN registry 110 logs the invalid challenge response, and sends messages during 352 to the verifying device 106, and during 350 to the relying party 108 server, indicating that the user 102's identity was not authenticated.

If the challenge response is valid, then control passes from 342 to operations 344, 346 and 348 wherein: during 346 the SSN registry 110 logs the valid challenge response in memory, during 342 the SSN registry 110 sends a message to relying party 108 indicating that SSN use is approved and user identity has been authenticated, during 344 the relying party 108 sends an acknowledgement message to SSN registry 110, during 346 the SSN registry 110 sends an acknowledgement message to verifying device 106 indicating that SSN use is approved and user identity has been authenticated and logs the valid challenge response to memory, and in 348 the verifying device 106 displays an acknowledgement message to user.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a social security number (SSN) registry server, for a verification of authorized use of a social security number by a user request seeking access to resources of a relying party server, where the SSN is used by the relying party server during the course of authenticating the user, the method comprising:
    receiving, by the SSN registry server, an SSN verification request issued by the relying party server, wherein the SSN registry server comprises a storage comprising a set of SSN records where each SSN record includes: a user SSN and a digital certificate associated with the user SSN, and wherein the SSN verification request includes: an SSN of the user and an identifying information of the relying party server, and wherein the digital certificate includes a public key and a digital signature;
    finding a matching SSN record in the set of SSN records corresponding to the SSN of the user in the received SSN verification request;
    issuing, in response to the finding the matching SSN record, an SSN authentication request message to a message destination associated with the matching SSN, wherein the message destination is associated with the user corresponding to the matching SSN record;
    receiving, by the SSN registry server, an approval response message to the SSN authentication request message;
    performing a challenge/response operation between the SSN registry server and a verifying device associated with the matching SSN, wherein the SSN registry server verifies that the verifying device associated with the matching SSN has stored a private key that is associated with the public key of the digital certificate; and
    transmitting, by the SSN registry server to the relying party server in accordance with the receiving an approval response and performing a challenge/response operation, a response to the SSN verification request based upon the performing the challenge/response operation,
    wherein the digital certificate further includes a social security number.

2. The method of claim 1, wherein the verifying device also originates the user request seeking access to resources of the relying party server.

3. The method of claim 1, wherein the SSN authentication request message is a text message.

4. The method of claim 1, wherein the SSN authentication request message is an email message.

5. A non-transitory computer-readable medium including computer executable instructions that, when executed by a processor on a social security number (SSN) registry server, facilitate performing a method for a verification of authorized use of a social security number by a user request seeking access to resources of a relying party server, where the SSN is used by the relying party server during the course of authenticating the user, wherein the method carried out by the SSN registry server comprises:
    receiving, by the SSN registry server, an SSN verification request issued by the relying party server, wherein the SSN registry server comprises a storage comprising a set of SSN records where each SSN record includes: a user SSN and a digital certificate associated with the user SSN, and wherein the SSN verification request includes: an SSN of the user and an identifying information of the relying party server, and wherein the digital certificate includes a public key and a digital signature;
    finding a matching SSN record in the set of SSN records corresponding to the SSN of the user in the received SSN verification request;
    issuing, in response to the finding the matching SSN record, an SSN authentication request message to a message destination associated with the matching SSN, wherein the message destination is associated with the user corresponding to the matching SSN record;
    receiving, by the SSN registry server, an approval response message to the SSN authentication request message;
    performing a challenge/response operation between the SSN registry server and a verifying device associated with the matching SSN, wherein the SSN registry server verifies that the verifying device associated with the matching SSN has stored a private key that is associated with the public key of the digital certificate; and
    transmitting, by the SSN registry server to the relying party server in accordance with the receiving an approval response and performing a challenge/response operation, a response to the SSN verification request based upon the performing the challenge/response operation,
    wherein the digital certificate further includes a social security number.

6. The non-transitory computer-readable medium of claim 5, wherein the verifying device also originates the user request seeking access to resources of the relying party server.

7. The non-transitory computer-readable medium of claim 5, wherein the SSN authentication request message is a text message.

8. The non-transitory computer-readable medium of claim 5, wherein the SSN authentication request message is an email message.

9. A social security number (SSN) registry server comprising:
- a processor; and
- a non-transitory computer-readable medium including computer executable instructions that, when executed by the processor, facilitate performing a method for a verification of authorized use of a social security number by a user request seeking access to resources of a relying party server, where the SSN is used by the relying party server during the course of authenticating the user, wherein the method comprises:
- receiving, by the SSN registry server, an SSN verification request issued by the relying party server, wherein the SSN registry server comprises a storage comprising a set of SSN records where each SSN record includes: a user SSN and a digital certificate associated with the user SSN, and wherein the SSN verification request includes: an SSN of the user and an identifying information of the relying party server, and wherein the digital certificate includes a public key and a digital signature;
- finding a matching SSN record in the set of SSN records corresponding to the SSN of the user in the received SSN verification request;
- issuing, in response to the finding the matching SSN record, an SSN authentication request message to a message destination associated with the matching SSN, wherein the message destination is associated with the user corresponding to the matching SSN record;
- receiving, by the SSN registry server, an approval response message to the SSN authentication request message;
- performing a challenge/response operation between the SSN registry server and a verifying device associated with the matching SSN, wherein the SSN registry server verifies that the verifying device associated with the matching SSN has stored a private key that is associated with the public key of the digital certificate; and
- transmitting, by the SSN registry server to the relying party server in accordance with the receiving an approval response and performing a challenge/response operation, a response to the SSN verification request based upon the performing the challenge/response operation,
- wherein the digital certificate further includes a social security number.

10. The server of claim 9, wherein the verifying device also originates the user request seeking access to resources of the relying party server.

11. The server of claim 9, wherein the SSN authentication request message is a text message.

12. The server of claim 9, wherein the SSN authentication request message is an email message.

* * * * *